United States Patent [19]

Dong

[11] Patent Number: 4,657,424
[45] Date of Patent: Apr. 14, 1987

[54] NONROTATABLE CLAMP FOR AUTOMATIVE STEERING LINKAGE

[75] Inventor: Yen O. Dong, Troy, Mich.

[73] Assignee: Ford Motor Company, Dearborn, Mich.

[21] Appl. No.: 813,369

[22] Filed: Dec. 24, 1985

[51] Int. Cl.⁴ .............................................. F16B 7/06
[52] U.S. Cl. ........................................ 403/46; 403/77
[58] Field of Search ............... 403/77, 118, 290, 46, 403/320, 307

[56] References Cited

U.S. PATENT DOCUMENTS

| | | | |
|---|---|---|---|
| 1,683,516 | 9/1928 | Adams | 403/118 X |
| 1,731,759 | 10/1929 | Winterfeld | 403/373 |
| 2,451,062 | 10/1948 | Booth | 403/290 |
| 2,526,470 | 10/1950 | Gauthier | 403/46 |
| 3,498,650 | 3/1970 | Strange | 287/53 |
| 3,867,050 | 2/1975 | Pitner | 403/373 |
| 4,042,306 | 8/1977 | Murray | 403/118 |

FOREIGN PATENT DOCUMENTS 78907 10/1919 Austria ................................ 403/46

OTHER PUBLICATIONS

Ford Motor Company's 1983 Model Shop Manual for Light Trucks, p. 13-24-2.

*Primary Examiner*—Andrew V. Kundrat
*Attorney, Agent, or Firm*—Jerome R. Drouillard; Roger L. May

[57] ABSTRACT

An adjuster for joining a ball stud assembly to the linkage bar of an automotive steering linkage comprises a threaded fastener attached to the ball stud assembly, a threaded portion extending axially from the linkage bar, and a tubular sleeve having internal threads which are threadedly engaged with the threaded fastener attached to the ball stud assembly and to the threaded portion extending from the linkage bar. First and second nonrotatable clamps are disposed about the tubular sleeve in the vicinity of each threaded portion and function to lock the tubular sleeve against rotation. The nonrotatable clamps may be placed upon the ball stud assembly and linkage bar in only one rotational orientation.

4 Claims, 4 Drawing Figures

NONROTATABLE CLAMP FOR AUTOMATIVE STEERING LINKAGE

BACKGROUND OF THE INENTION

1. Field of the Invention

This invention relates to a nonrotatable clamp for an automotive steering linkage.

2. Disclosure Information

Automotive steering linkages are employed for the purpose of connecting steerable wheel spindles to a steering gear arrangement. The length of these linkages must be adjustable in order to permit multiple steered wheels to work properly with one another and with the steering gear. One means for permitting adjustability of a steering linkage is illustrated in Ford Motor Company's 1983 Model Shop Manual for Light Trucks at page 13-24-2. This means involves the use of a threaded tubular adjusting sleeve which is threadably engaged with a ball stud assembly on one end and a linkage bar at the other end. The adjusting sleeve is prevented from rotating by means of U-shaped adjusting clamps which tighten the adjusting sleeve upon the threaded portions inserted into the sleeve at either end, thereby preventing the adjusting sleeve from rotating. Because the bolt employed for the purpose of fastening the clamp extends some distance radially outward from the axis of the steering link, clearance must be provided by the steering system designer to assure that an adequate space envelope exists about the steering link to accommodate the clamp when it is situated in any possible location. This characteristic is undesirable with certain vehicles in which the space alloted to the steering system is reduced by the need to accommodate other chassis componentry.

U.S. Pat. No. 3,867,050 discloses an assembly comprising a shaft and a connecting element for a power take off driveshaft which transmits rotational torque and which is not adjustable. A non-circular cross section is used to provide a non-rotating connection between a U-joint yoke and the power transmission shaft.

U.S. Pat. No. 3,498,650 discloses a fastening device for connecting an integral hub knob, such as the control knob of a radio or the like, to a corresponding control shaft. This device is not suitable for use in an adjustable automotive steering linkage assembly because it cannot be locked in one axial location.

U.S. Pat. No. 4,042,306 discloses a heavy wire holding element for securing the adjustable hydraulic cylinder of a fork lift truck.

U.S. Pat. No. 1,731,759 discloses a repair sleeve for a scythe snathes having a noncircular cross section which also cannot be used to secure the mating parts of an automotive steering system in an adjustable fashion.

It is an object of the present invention to provide a nonrotatable clamp for an automotive steering linkage such that the clamp may be installed upon the linkage in only one rotational orientation but which nevertheless permits adjustment of a tubular adjusting sleeve operatively associated with the nonrotatable clamp.

SUMMARY OF THE DISCLOSURE

A non-rotatable clamp for use with adjustable linkages such as the steering linkage of an automotive vehicle comprises a U-shaped section including a bight for closing upon and gripping a cylindrical body such as a linkage bar or rod inserted into the bight and opposing flanges attached to the opposite ends of the bight for closing the bight upon the cylindrical body. A rotation preventing sleeve extends axially from the U-shaped section and incorporates a noncircular cross section for at least part of its length. The nonrotatable clamp of the present invention is suitable for use with an adjuster for joining a ball stud assembly to the linkage bar of an automotive steering linkage where the adjuster assembly comprises a threaded fastener attached to the ball stud assembly, a threaded portion attached to the linkage bar and extending coaxially with the linkage bar, and a tubular sleeve having threads formed internally therein for threadedly engaging the threaded fastener attached to the ball stud assembly and the threaded portion attached to the linkage bar.

The adjuster assembly is preferably completed by first and second nonrotatable clamps disposed about the tubular sleeve with the first clamp engaging both the tubular sleeve in the region into which the threaded fastener extends and a noncircular cross section comprising part of the threaded fastener. The second clamp engages both the tubular sleeve in the region surrounding the threaded portion of the linkage bar and a noncircular cross section of the linkage bar. The tubular sleeve is, therefore, selectively allowed to rotate with respect to the linkage bar and with respect to the ball stud assembly when the clamps are loose, while at the same time the clamps will be prevented from rotating with respect to either the ball stud assembly or the linkage bar.

The noncircular cross section of the sleeve preferably comprises a plurality of arcuate segments joined by straight segments arranged so as to be telescopically engageable with mating noncircular cross sections comprising part of either the linkage bar or the threaded fastener.

DESCRIPTION OF THE PREFERRED EMBODIMENTS

Figure 1:
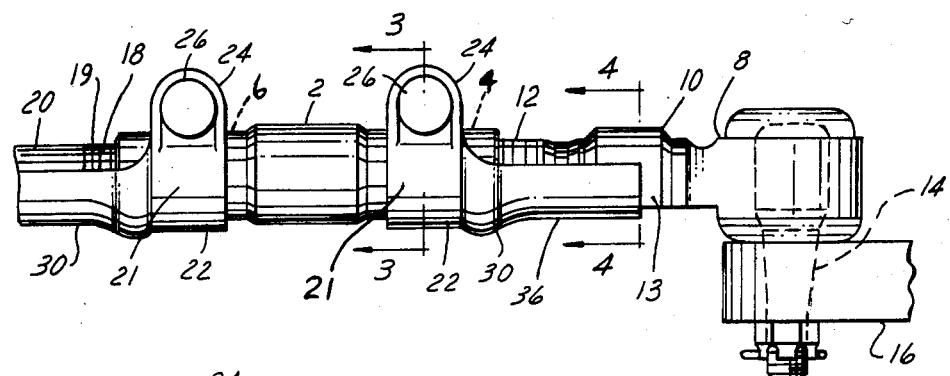
FIG. 1 is a plan view of a clamp assembly according to the present invention.

As shown in FIG. 1, the nonrotatable clamp of the present invention may be used as part of an adjuster for joining a ball stud assembly to the linkage bar of an automotive steering linkage. Such linkages typically comprise a tie rod connected between two steerable wheel spindles or a drag link connected between the steering gear's pitman arm and a tie rod. In FIG. 1, a tie rod is illustrated as having a ball stud assembly 8 with tapered ball stud 14 attached to steering spindle arm 16 in a conventional manner. The adjuster assembly attaches ball stud assembly 8 to linkage bar 18. The central portion of the adjuster assembly includes tubular sleeve 2 which lies between ball stud assembly 8 and linkage bar 18. Tubular sleeve 2 is coaxial with linkage bar 18 and threaded fastener 10 which comprises part of ball stud assembly 8. Internal threads 4 are formed inside one end of tubular sleeve 2 for the purpose of accepting threaded portion 12 of threaded fastener 10. A second internal threaded portion 6 of tubular sleeve 2 accepts threaded portion 19 which extends axially from linkage bar 18. Because threads 4 and 6 are cut in opposite directions as are threads 12 and 19, rotation of tubular sleeve 2 in one direction will cause the linkage bar and ball stud assembly to move away from each other, whereas rotation in the opposite direction will cause the linkage bar and ball stud assembly to move toward each other. In this manner the linkage is adjustable.

Figure 3:
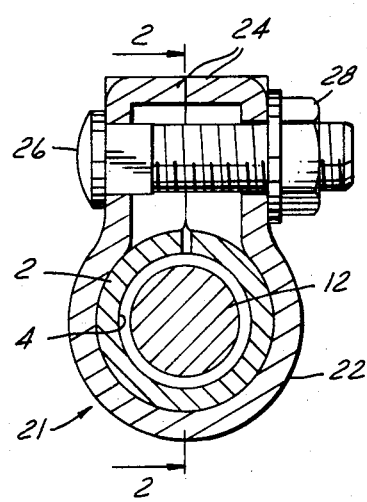
FIG. 3 is a partial cross section of the clamp assembly of FIG. 1 taken along the line 3—3 of FIG. 1.

As shown in FIG. 3, a slot, 3, is provided in tubular sleeve 2 so as to permit tubular sleeve 2 to be locked upon the threads of its mating components. This locking is accomplished by means of two nonrotatable clamps 21 which are applied at either end of tubular sleeve 2.

Each nonrotatable clamp 21 (FIGS. 2 and 3) comprises a U-shaped section including a bight section, 22, which encircles and closes upon tubular sleeve 2, and opposing flanges 24 which are integral with bight section 22. Flanges 24 are pierced by and held in abutting contact by bolt 26 and accompanying nut 28. Accordingly, when the desired adjustment of the steering linkage has been achieved, tubular sleeve 2 may be prevented from rotating further by tightening bolts 26 so as to cause the bight 22 of each clamp 21 to grip tubular sleeve 2 upon its threaded area, thereby preventing rotation of the sleeve upon the threaded cylinder inserted into the sleeve, whether that insert is threaded portion 12 of threaded fastener 10 or threaded portion 19 of linkage bar 18.

As noted earlier in this application, the nonrotatable clamps of the present invention may be installed upon ball stud assembly 8 and linkage bar 18 in but one angular orientation. As a result, the location of bolt 26, nut 28 and flanges 24 will always be known by the designer of the steering linkage and this will enable the designer to provide sufficient operating clearance for the linkage assembly without providing the unnecessary clearances which would be required were the bolt, nut, and flange portion of the adjusting clamp to be allowed to assume any random rotational position about tubular sleeve 2. This nonrotatability is assured by the provision of telescopically mating noncircular cross sections for the sleeve portion 30 of nonrotatable clamps 21 and for the corresponding mating portions found on threaded fastener 10 and linkage bar 18.

Figure 2:
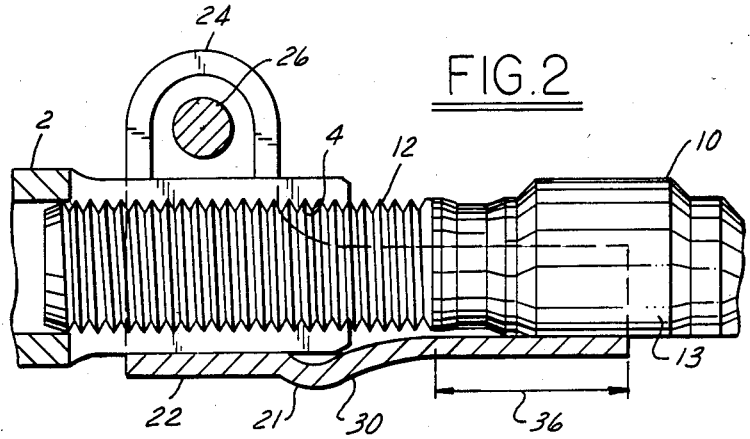
FIG. 2 is a partial cross section of the clamp assembly of FIG. 1 taken along the line 2—2 of FIG. 3.
Figure 4:
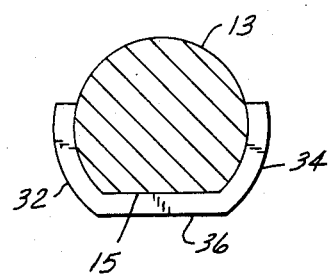
FIG. 4 is a cross section of the clamp assembly of FIG. 1 taken along line 4—4 of FIG. 1.

As shown in detail in FIG. 2, sleeve 30 extends axially from the bight section of nonrotatable clamp 21 and includes a noncircular cross section shown in FIG. 4. This noncircular cross section is comprised of arcuate segments 32 and 34 joined by straight segment 36. Straight segment 36 matches a flat area 15 formed as a portion of the noncircular cross section of threaded fastener 10. Straight segment 36 is formed along the balance of the length of sleeve 30 as shown by the dimension 36 in FIG. 2. This allows straight segment 36 to telescopically engage flat area 15 on threaded fastener 10 when that fastener is at any fully engaged threaded position within tubular sleeve 2. The engagement of the sleeves 30 with the mating noncircular cross sections of threaded fastener 10 and linkage bar 18 is thus said to be "telescopic" because the sleeves slide upon the threaded fastener and the linkage bar as the threaded adjustment of tubular sleeve 2 is obtained. It must be noted that although FIGS. 2-4 pertain primarily to that portion of the adjuster involving ball stud assembly 8, that portion of the adjuster pertaining to linkage bar 18 is identical. For example, linkage bar 18 has a flat area formed on portion 20 for engaging straight segment 36 found on that nonrotatable clamp which engages the linkage bar.

The clamp assembly of the present invention may be constructed of such materials as ferrous or nonferrous metals or fiber reinforced plastic compositions. Other suitable materials will be apparent to those skilled in the art to which this invention relates. In high volume automotive production, materials such as Society of Automotive Engineers (SAE) 1025 steel could preferably be used.

Various modifications and variations will no doubt occur to those skilled in the various arts to which this invention pertains. For example, the particular cross sectional configuration of the noncircular areas employed with this device may be varied from those disclosed herein. Further, the method of clamping the bight of the U-shaped section, or possibly the decision to use the U-shaped section as the clamp portion of the nonrotatable clamp is subject to change. These and all other variations which basically rely on the teachings through which this disclosure has advanced the art are properly considered within the scope of this invention as defined by the appended claims.

I claim:

1. A nonrotatable clamp, for use with an adjustable linkage bar, comprising:
    a U-shaped section comprising a bight for closing upon and gripping a cylindrical body inserted into said bight, said U-shaped section having opposing flanges attached to the ends of said bight for closing said bight; and
    a hollow rotation preventing sleeve portion extending axially from said U-shaped section and having a non-circular cross section for at least part of its length, with said non-circular cross section adapted to engage with a mating non-circular cross section of said linkage bar.

2. The nonrotatable clamp according to claim 1 wherein the cross sectional configuration of said rotation preventing sleeve comprises a plurality of arcuate segments joined by straight segments.

3. An adjuster for joining a ball stud assembly to the linkage bar of an automotive steering linkage comprising:
    a threaded fastener attached to said ball stud assembly;
    a threaded portion extending axially from said linkage bar;
    a tubular sleeve having internal threads threadedly engaged with said threaded fastener attached to said ball stud assembly and said threaded portion extending from said linkage bar;
    a first clamp disposed about said tubular sleeve in the region into which said threaded fastener extends, said first clamp being telescopically but nonrotatably engaged with said threaded fastener; and
    a second clamp disposed about said tubular sleeve in the region into which said threaded portion of said linkage bar extends, said second clamp being telescopically but nonrotatably engaged with said linkage bar
    and wherein each of said nonrotatable clamps comprise: a U-shaped section comprising a bight for closing upon and gripping said tubular sleeve so as to selectively allow said tubular sleeve to rotate with respect to the remainder of said adjuster: and a hollow rotation preventing sleeve section extending axially from said U-shaped section.

4. The adjuster according to claim 3 wherein at least one of said rotation preventing sections comprises a tubular sleeve having a noncircular cross section which is telescopically engageable with a mating noncircular cross section comprising part of either said threaded fastener or said linkage bar.

* * * * *